Figure 5:
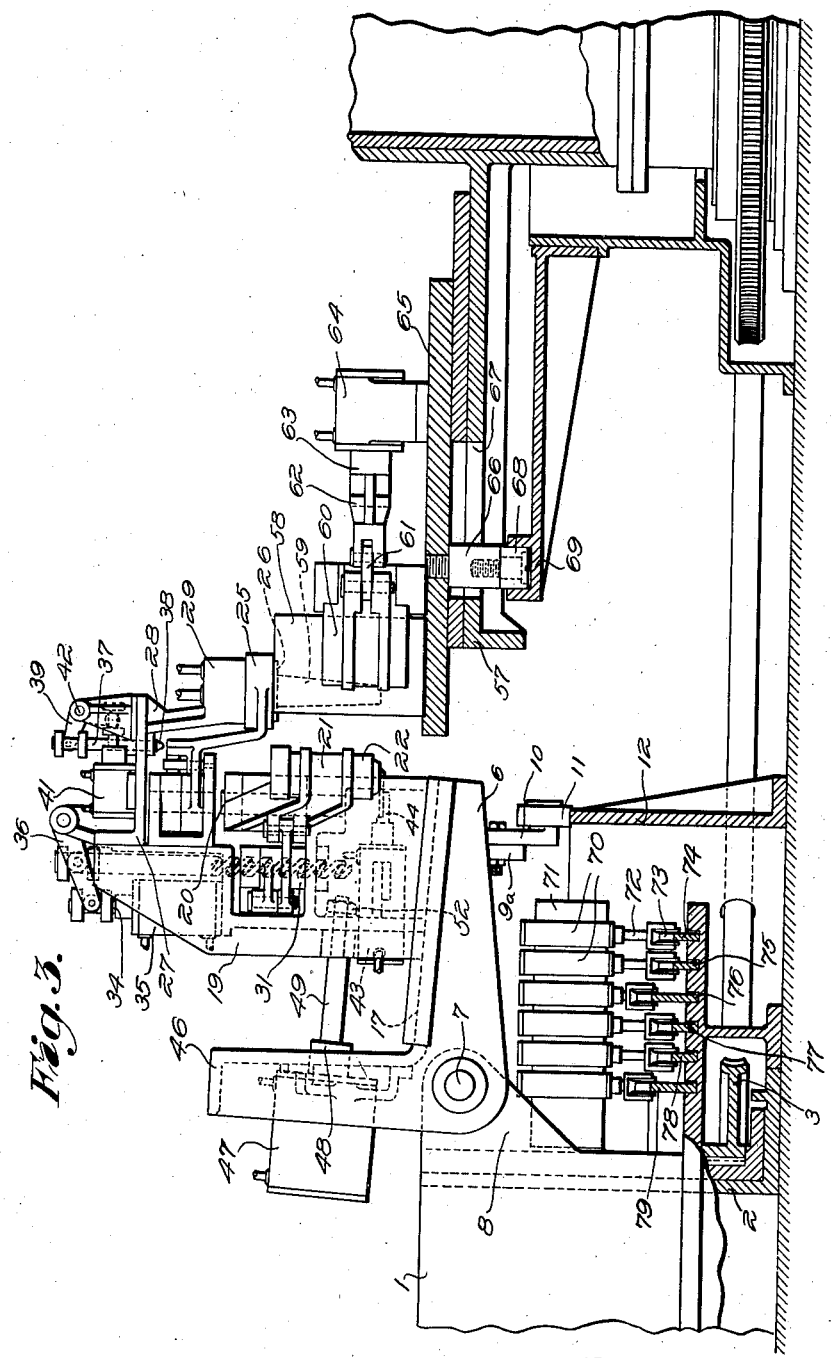

Feb. 11, 1936.    R. W. CANFIELD    2,030,810
GLASS GATHERING AND FORMING MACHINE
Filed March 8, 1929    3 Sheets-Sheet 1
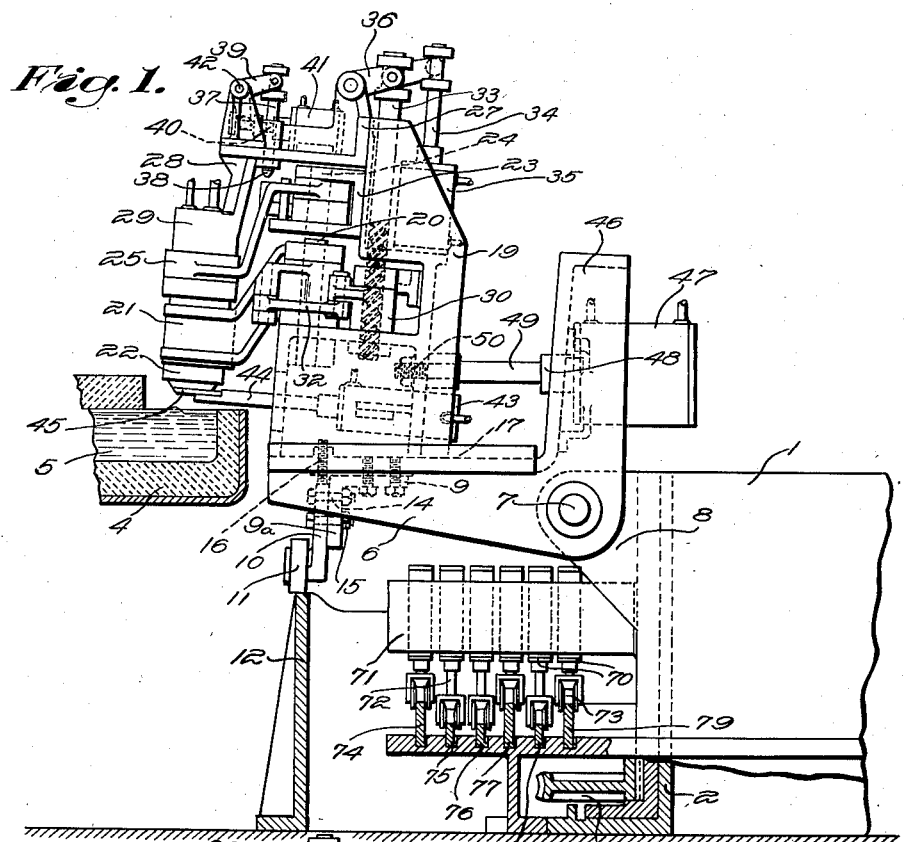
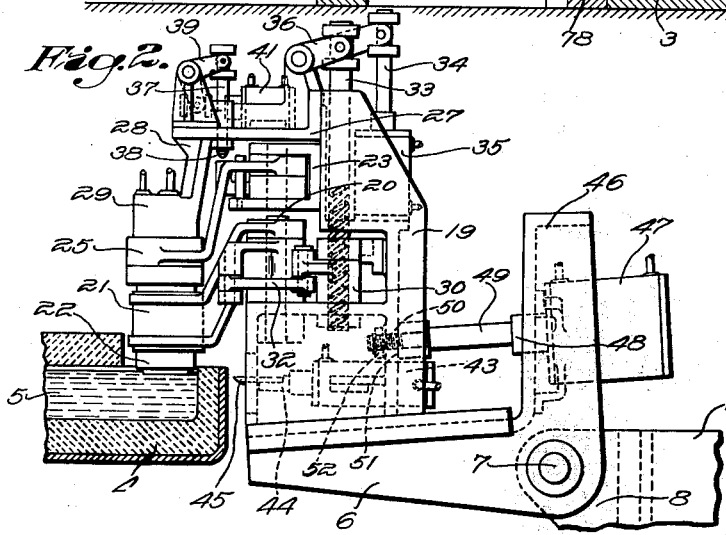
Witness:
W. B. Thayer.
Inventor:
Robert W. Canfield
by Brown & Parham
Attorneys Feb. 11, 1936. R. W. CANFIELD 2,030,810
GLASS GATHERING AND FORMING MACHINE
Filed March 8, 1929 3 Sheets-Sheet 2

Witness;
W. B. Thayer

Inventor:
Robert W. Canfield
by Brown + Parker
Attorneys

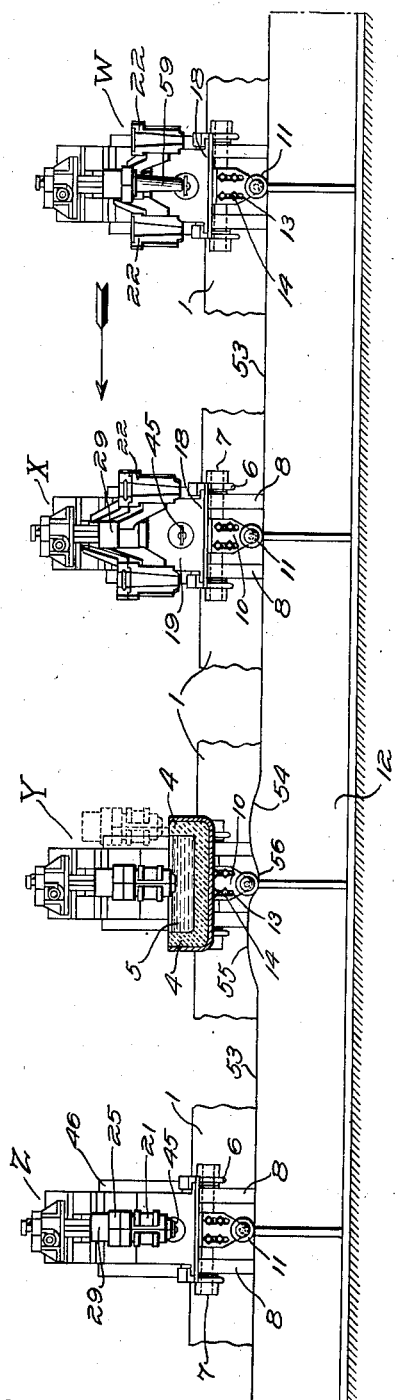

Patented Feb. 11, 1936

2,030,810

UNITED STATES PATENT OFFICE 2,030,810

GLASS GATHERING AND FORMING MACHINE

Robert W. Canfield, West Hartford, Conn., assignor to Hartford-Empire Company, Hartford, Conn., a corporation of Delaware Application March 8, 1929, Serial No. 345,316

3 Claims. (Cl. 49—5)

My invention relates generally to the manufacture of glassware and more particularly to a glass gathering and forming machine of that type which includes a table or carrier mounted to rotate about a vertical axis adjacent to a gathering pool of molten glass and having a plurality of glass gathering receptacles mounted thereon and operated in such manner as to be lowered in turn during each cycle of rotation of the carrier to position to contact with the surface of the glass gathering pool and, after being charged with glass from the pool, to be raised and carried by the rotation of the carrier away from the gathering pool to permit the formation of the gathered glass into an article of glassware.

It has been proposed to support each glass gathering receptacle on the rotating carrier of a machine of the type above described by mechanism including parallel links so that the gathering receptacle may be moved vertically at the proper times to and from the surface of a glass gathering pool. It also has been proposed to support each glass gathering receptacle on the rotary carrier for oscillatory movement about a horizontal axis and for controlling such oscillatory movements so that the axis of the glass gathering receptacle will be inclined from the vertical when the gathering receptacle has been lowered to its glass gathering position in contact with the glass of a gathering pool.

An object of the present invention is to simplify and improve the mechanism for supporting and controlling the movements of a movably mounted glass gathering receptacle on a rotary carrier so that such gathering receptacle may swing about a horizontal axis to and from a glass gathering position at the surface of a gathering pool but will be maintained with its axis vertical during the time that such glass gathering receptacle is in its glass gathering position, during the transfer of the gathered preliminarily shaped glass from the receptacle to an associate finishing mold, and during all other portions of the cycle of rotation of the carrier except such short portions thereof as are required to lift the gathering receptacle over the walls of a pot or other container in which the gathering pool is disposed. The operations of gathering the glass and preliminarily shaping and transferring the gathered glass thus will be facilitated and aided and the results of such operations will be rendered more uniform and otherwise improved.

A further object of the invention is the provision of a glass forming machine of the character described that will be relatively simple in construction, reliable in use, not likely to get out of order easily, and thoroughly practical commercially.

Other objects and advantages of the invention will be apparent from a consideration of the following description of the construction and operation of the practical embodiment of the invention that is illustrated in the accompanying rawings, in which:

Figure 1 is a fragmentary view, mainly in elevation and partly in vertical section, showing a glass gathering and parison forming unit supported on a rotary carrier and raised to dispose the lower end of the gathering unit above the walls of a container for a glass gathering pool, the view showing also a severing member in the position which it assumes after servering the gathered glass from the glass of the pool and showing also mechanism for controlling the operations of the glass gathering and parison forming unit and associate parts;

Fig. 2 is a view generally similar to Fig. 1 but showing the glass gathering unit in its glass gathering position in contact with the surface of the gathering pool, parts of the structure shown in Fig. 1 being omitted.

Fig. 3 is a view, partly in vertical section and partly in elevation, showing the glass gathering and parison forming unit in position to permit the transfer of a parison therefrom to a finishing mold on an associate rotary finishing mold table, and Fig. 4 is an elevation showing in developed form a cam suitable for controlling the cycle of vertical movements of the glass gathering and parison forming unit during a complete cycle of rotation of the rotary carrier and showing positions of the glass gathering unit and of component elements thereof and associate parts at a plurality of different places along the cam.

A practical embodiment of the invention may comprise a rotary carrier 1 which is shown as being of hub-like formation and as being mounted to rotate about the axis of a vertical column 2. Any suitable known means may be provided for rotating the carrier 1. The drawings show a worm wheel 3 secured to the carrier 1 and rotary motion may be imparted to the worm wheel by a worm, not shown.

The carrier 1 may support a plurality of circumferentially spaced glass gathering and parison forming units, only one of which is shown in the drawings. Such unit is mounted on the carrier 1 to travel with the latter about the vertical axis of the latter and for movement about a horizontal axis so that the glass gathering and parison forming unit may be raised at the proper place in the cycle of rotation of the carrier to clear a side wall of a pot or container 4 in which a pool of molten glass 5 is disposed, then lowered into glass gathering relation with the pool, then raised to clear the opposite wall of the container 4 and again lowered to the same level at which the gathering operation took place. The axis of the cavity of the glass gathering and parison forming unit will be vertical at this last named level and thus will be vertical not only during the glass gathering operation but also during the preliminary shaping of the gathered glass and during the transfer of the preliminarily shaped glass or parison to a finishing mold on an adjacent rotary finishing mold table.

The supporting and operating structure now preferred by me for the glass gathering and parison forming unit includes a substantially radial supporting member 6 that is pivotally supported at its inner end on a horizontal pivotal element 7 which is shown as extending between a pair of spaced radial ears 8 on the carrier 1. A bracket 9 is secured to the under side of the outer end portion of the member 6 and has a depending arm 9a to which a vertically adjustable arm 10 is secured. The arm 10 carries a cam roll 11 arranged to run on a closed cam track 12 that encircles the axis of rotation of the carrier 1. The arm 10 is shown in Fig. 4 as being provided with vertical slots 13. Fastening devices, such as the bolts 14 extend through the slots 13 and through openings in the bracket arm 9a and are engaged by the nuts 15, Fig. 1. A vertically disposed stop screw 16 threadedly engages the outer end portion of the supporting member 6 above the upper end of the arm 10 and can be adjusted to limit the height to which the upper end of the arm 10 is adjustable on the bracket arm 9a. When the desired adjustment of the arm 10 on the arm 9a has been effected, the nuts 15 are tightened to secure the members 10 and 9a firmly together. It is apparent that the path of swinging movement of the outer end of the supporting member 6 may be shifted vertically without changing the contour of the upper working surface of the cam 12 by adjusting the screw 16 and changing the vertical position of the arm 10 on the bracket arm 9a.

The supporting member 6 has a substantially flat upper surface and is provided with a radial slideway 17 in which the base portion 18 of a radially slidable frame structure 19 is adapted to slide. The body of the frame structure 19 is shown as being inclined slightly from a line perpendicular to the lower surface of its base structure and to the supporting surface of the slideway 17.

The frame structure 19 carries an upstanding pivot element 20 which is parallel with the axial line of the body of such frame structure and supports the arms of holders 21 for the half sections 22 of a parison body mold. A bracket 23 on the frame structure carries a pivot element 24 on which are mounted the arms of holders 25 for the half sections 26, Fig. 3, of a two-part parison neck mold. The pivot element 24 preferably is vertically aligned with the pivot element 20. A bracket 27 on the frame structure has a depending arm 28 which carries a head 29 above the closed parison neck mold. The head 29 may be a combined suction and blow head and adapted for operative connection at different times in any suitable known manner with sources of subatmospheric and super-atmospheric pressures.

The frame structure 19 also may support mechanism for opening and closing the parison body mold and the parison neck mold at the proper times in the cycle of rotation of the carrier 1. Such means may have any suitable known construction and mode of operation. The particular parison body mold opening and closing mechanism illustrated in the drawings comprises rock collars 30 and 31, respectively, Figs. 1 and 3, connected by suitable linkage 32 with the arms of the holders 21 for the halves of the parison body mold. The rock collars 30 are rotated simultaneously in opposite directions by vertically reciprocable pins 33 having spirally screw threaded portions in mesh with spirally threaded internal portions of the collars 30 and 31, whereby, when the pins 33 are moved downward from the position indicated in Figs. 1 and 2 to the position indicated in Fig. 3, the halves of the parison body mold will be opened while the return or upward movement of the pins 33 from the position shown in Fig. 3 to the position shown in Fig. 1, will cause closing of the halves of the parison body mold. A vertically reciprocable piston rod 34 protrudes from the upper end of a vertical cylinder 35 on the frame structure 19 and is connected by suitable motion transmitting mechanism generally indicated at 36 with the vertically reciprocable pins 33 so that the vertical reciprocations of the piston rod 34, which of course are caused by the reciprocations of a piston, not shown, in the cylinder 35, will cause like movements of the pins 33. The particular mechanism for opening and closing the parison body mold which has just been briefly described per se forms no part of the present invention and is not claimed herein and consequently need not be described in greater detail.

The mechanism for opening the halves of the parison neck mold may comprise a vertically movable pin 37 having a tapering or wedge shaped lower end 38. A bell crank lever 39 is connected at one end with a piston rod 40 that protrudes from a horizontal cylinder 41 on the bracket 27. The reciprocation of the piston rod 40 will cause the bell crank lever 39 to swing about a horizontal axis 42 and the bell crank lever is suitably connected with the pin 37 so as to move the latter vertically as the piston rod 40 reciprocates. Downward movement of the pin 37 from the position shown in Figs. 1, 2 and 3, will cause the tapering lower end of the pin 37 to be projected between upwardly turned adjacent lugs on the arms of the holders 25 for the halves of the parison neck mold so as to cam such arms apart and thereby open the halves of the neck mold. The closing of the neck mold may be effected by any suitable means and in any suitable known manner as by means of a spring (not shown) connecting the arms of the holders for the halves of the neck mold or by arranging the parison neck mold and the parison body mold halves in such relation that the halves of the parison body mold will contact while closing with the open halves of the neck mold and close the latter.

The frame structure 19 supports a pneumatic cylinder 43 from which a piston rod 44 extends outward in a generally radial direction. The piston rod 44 carries a shear blade 45 in position to wipe across the lower end of the closed parison body mold when the piston 44 moves to its outwardly projected position, as shown in Fig. 1.

The inner end portion of the supporting member 6 is shown as being integral with an upturned supporting arm or member 46 on which is mounted a pneumatic cylinder 47 having a reduced end portion 48 extending radially outward through an aperture in the supporting member 46. A piston rod 49 protrudes from the reduced end portion 48 of the cylinder 47 in a generally radial direction and is connected at its outer end, as by the threaded portion 50, the shoulder 51 and the nut 52, with the adjacent wall of the body of the frame structure 19. The axis of the piston rod 49 and of the cylinder 47 extends parallel with the supporting surface of the slideway 17. Consequently, when the piston rod 49 is reciprocated, the frame structure 19 and the parts carried thereby will be slid radially on the supporting member 6.

The upper or working surface of the cam 12 comprises a horizontal portion 53 which as shown in Fig. 4 constitutes by far the greater part of the working surface of the cam. The remainder of the working surface of the cam 12 comprises a pair of convexly curved adjacent raised portions 54 and 55, respectively, and a connecting portion 56 which is level with the horizontal portion 53 of the cam track. The effective length of the cam roll supporting arm 10 is adjusted with relation to the angle of inclination of the body of the frame structure 19 and of the pivot elements 20 and 24 from a perpendicular to the plane of the supporting surface of the slideway 17 so that the axial line of the cavity within the closed parison body and closed neck mold will be vertical when the cam roll 11 is traversing the horizontal portion 53 and the portion 56 of the cam track. The raised portions 54 and 55 of the cam track are of sufficient height to raise the lower end of the closed parison body mold sufficiently to clear the side walls of the container 4 in which the gathering pool of glass is disposed as the rotation of the carrier 1 swings the glass gathering and parison forming unit across such walls before and after a glass gathering operation. As illustrated in Fig. 4, the glass gathering and parison forming unit thus is disposed with its axis vertical at all times in the cycle of rotation of the carrier 1 except when such unit is being moved across the side walls of the container for the glass gathering pool.

The improved machine may include a bottom plate, not shown, which may be moved to position to close the lower end of the parison body mold so as to permit positive pressure to be employed to expand the gathered glass to preliminary shape. As an alternative arrangement, the cut-off blade 45 may be retained in its outwardly projected position and serve as a bottom closure for the parison body mold during the application of positive pressure to effect this preliminary shaping of the gathered glass. When the preliminary shaping of the gathered glass has been effected, the parison body mold may be opened to leave the glass suspended from the closed neck mold. The operation of the piston in the cylinder 47 may be controlled to control the radial movements of the frame structure 19 and of the glass gathering and parison forming unit as desired. The glass gathering unit may be in its outwardly projected position at the time the gathering operation takes place and may be retained in that position during the entire cycle of rotation of the carrier 1. If desired, the glass gathering unit may be moved radially inward after the gathering operation and retained in that position until near the time for the transfer of the parison therefrom, at which time the frame structure may be again projected radially outward to the position shown in Fig. 3.

A finishing mold on an adjacent rotary table 57 preferably will comprise halves 58 arranged and operated so as to close about the suspended glass parison 59 at the transfer station. The halves 58 of the finishing mold may be carried by pivotally supported holders 60 connected by links 61 with a cross head 62 which is movable radially by a piston rod 63. The latter protrudes from a pneumatic cylinder 64. A radially slidable plate 65 supports the finishing mold and its operating mechanism and carries a stud 66 which depends through radial slot 67 in the table 57 and carries a cam roller 68 arranged to travel in a closed cam groove or track 69. The cam groove or track 69 is laid out so as to move the plate 65 and the parts thereon radially inward and outward at the proper times in the cycle of rotation of the table 57. The rotation of the table 57 may be synchronized with the rotation of the carrier 1 in any suitable known manner. The arrangement may be such that the finishing mold will be moved radially as it approaches the transfer station and as the halves of the finishing mold are closed about the parison 59 so that the finishing mold and the parison will move along substantially coincident paths during the closing of the finishing mold. The halves of the parison neck mold then will be opened to release the parison so that the latter may travel in the finishing mold for formation into an article of glassware in any suitable known manner, as by blowing.

The application and/or exhaust of pressures to and/or from the pressure cylinders and pressure applying heads of the improved mechanism may be controlled by valves, such as indicated at 70 in Figs. 1 and 3. These valves are shown as being disposed in radial series on a supporting member 71 that is carried by the carrier 1 and as having depending stems 72 provided at their lower ends with cam rollers 73 arranged to travel on stationary cams, such as indicated at 74, 75, 76, 77, 78 and 79, respectively. Suitable fluid conducting means, not shown, may be provided between the respective valves 70 and the cylinders or other parts which are controlled by or supplied with pressure from the valves and the respective cams 74 to 79 inclusive are suitably laid out so that the operations of the respective valves will take place in the proper sequence and at the proper times in the cycle of rotation of the carrier 1.

In a cycle of rotation of the carrier 1, the glass gathering and parison forming unit at one time moves past a transfer station, as indicated at W in Fig. 4. It will be noted that the halves of the parison body mold are open at this time and that the parison 59 is suspended from the closed parison neck mold. The cam roll 11 is at this time moving along the horizontal portion 53 of the working surface of the cam 12. At the transfer station, the halves of a finishing mold are closed about the suspended parison in the manner hereinbefore described and the halves of the parison neck mold are opened to release the parison. Consequently, at the time the glass gathering and parison forming unit reaches the position indicated at X in Fig. 4, the halves of both the parison body and parison neck mold are opened and thus are being cooled. After passing the position X the halves of the parison body and parison neck mold are closed. The rotation of the carrier 1 then causes the cam roller 11 to move up the inclined part of the raised portion 54 of the cam track to lift the lower end of the closed parison body mold above the adjacent wall of the container for the gathering pool as indicated by the dotted lines in the portion of Fig. 4 generally indicated at Y. The movement of the cam roller 11 along the downwardly inclined part of the portion 54 of the cam track will cause the lower end of the closed body mold to dip to the surface of the glass gathering pool as indicated by the full lines in the portion Y of Fig. 4. The lower end of the parison body mold will be in contact with the surface of the glass gathering pool when the roller 11 engages the portion 56 of the cam track. After such contact of the glass gathering unit with the glass gathering pool and the charging of the glass gathering unit, as by suction, the cam roller 11 will ride up the inclined part of the raised portion 55 of the cam track to raise the lower end of the closed parison body mold above the level of the opposite side wall of the container 4. The piston rod 44 then is projected outwardly from the cylinder 43 to wipe the cut-off member 45 across the lower end of the parison mold, thus severing from the gathered glass any strings or connecting glass between the parison body mold and the pool, and as the cam roller 11 reaches the summit of the portion 55 of the cam track, the lower end of the parison body mold will be moved across the adjacent side wall of the container 4 and then will start downwardly to the level at which the parison mold moves when the roller 11 is traveling on the horizontal portion 53 of the cam track. The charged parison mold continues to move horizontally as the roller travels the portion 53 of the cam track and preliminary shaping of the gathered glass may be taking place in the manner hereinbefore described, the cut-off member being retained in position to close the bottom of the parison mold, if desired. The preliminary shaping of the gathered glass may be taking place as the glass gathering and parison forming unit moves to the position indicated at Z in Fig. 4. After passing the position Z, the halves of the parison body mold will be opened so that the preliminarily shaped glass or parison will be suspended from the closed neck mold as the rotation of the carrier 1 brings the glass gathering and parison forming unit to the transfer station W, at which the parison will be transferred to the finishing mold in the manner herein described.

The various features of the invention may be modified, as to structure, combination and arrangement, to adapt the invention to different uses or different conditions of service without departing from the spirit and scope of such invention.

I claim:

1. In a glass forming machine, a carrier mounted to rotate about a vertical axis, a substantially radial rigid supporting member connected at its inner end with said carrier to travel with the latter and to swing angularly about a horizontal axis, a radially and rectilinearly movable glass gathering and parison forming unit mounted on said rigid supporting member, a gathering pool, means including a cam encircling the machine and interposed between the machine and the gathering pool, for controlling the angular movements of said rigid supporting member about said horizontal axis during each cycle of rotation of said carrier about said vertical axis, and means for moving said unit radially outwardly toward the gathering pool, whereby angular movement of the supporting member will cause the glass gathering and parison forming unit to be dipped into the glass in said pool.

2. In a glass forming machine, a carrier mounted to rotate about a vertical axis, a substantially radial rigid supporting member connected at its inner end with said carrier to travel with the latter and to swing angularly about a horizontal axis, a radially movable glass gathering and parison forming unit mounted on said rigid supporting member, a cam roller, a vertically adjustable arm supporting said roller and attached to said radial supporting member, and a closed cam track in position to be traversed by said roller during the rotation of said carrier about said vertical axis.

3. In a glass forming machine, a carrier mounted to rotate about a vertical axis, a bell crank lever directly pivotally connected to said carrier, and having a substantially horizontally supporting portion, and an upwardly extending arm, a glass gathering and forming unit mounted for radial movement on said supporting portion, a stationary closed cam encircling the machine, and located radially outwardly of the point of connection of the bell crank lever with the carrier, a cam roller attached to the substantially horizontal portion of the bell crank lever and engaging said cam, and means carried by the upwardly extending arm of said lever for imparting radial movement to the glass gathering and forming unit on the supporting portion of said bell crank lever.

ROBERT W. CANFIELD.